United States Patent [19]

Twedell

[11] 3,998,480
[45] Dec. 21, 1976

[54] TAKE-OFF FITTING FOR LOW PRESSURE NON-METALLIC DUCT SYSTEMS

[76] Inventor: Jack L. Twedell, 6749 S. Delaware, Littleton, Colo. 80120

[22] Filed: Dec. 4, 1974

[21] Appl. No.: 529,462

[52] U.S. Cl. .............................. 285/189; 285/321; 285/424
[51] Int. Cl.² .......................................... F16L 5/00
[58] Field of Search .......... 285/158, 189, 205, 201, 285/321, 424, 161, 222, 202, 204

[56] References Cited
UNITED STATES PATENTS

| 887,270 | 5/1908 | Richardson | 285/158 |
| 1,291,578 | 1/1919 | Mcphail | 285/222 |
| 1,659,094 | 2/1928 | Godfrey | 285/158 X |
| 3,761,116 | 9/1973 | Scheitlin | 285/192 |

Primary Examiner—Dave W. Arola
Attorney, Agent, or Firm—Edwin L. Spangler, Jr.

[57] ABSTRACT

This invention relates to metal or plastic pipe fittings for use in low pressure non-metallic duct work and, more specifically, to branch take-off fittings characterized by a tubular sleeve terminating adjacent one end in a circumferential stop-forming obstruction of some sort effective to prevent a continuous ring from sliding off the end when abutted thereagainst, a ring sized to engage the stop-forming obstruction while cooperating therewith to form a substantially air tight seal around the opening in the duct wall through which the sleeve passes, an annular groove encircling the sleeve spaced toward the opposite plain end thereof a distance equal to the thickness of the duct wall, and a split lock ring springable to the degree necessary for insertion into the annular groove, the lock ring and continuous ring cooperating with one another in assembled relation to maintain the sleeve detachably connected into the duct wall. The invention also encompasses the novel method of installing the fitting which comprises the steps of cutting a hole in the duct wall of a size sufficient to pass the stop-forming obstruction on the sleeve, passing the sleeve completely through said opening into the interior of the duct, slipping the continuous ring over the plain end of the sleeve before drawing said end back out through the opening until the continuous ring rests against the inside of the duct wall bordering same in substantially air tight sealed engagement therearound, and springing the split ring preparatory to releasably locking it into the annular groove.

7 Claims, 5 Drawing Figures

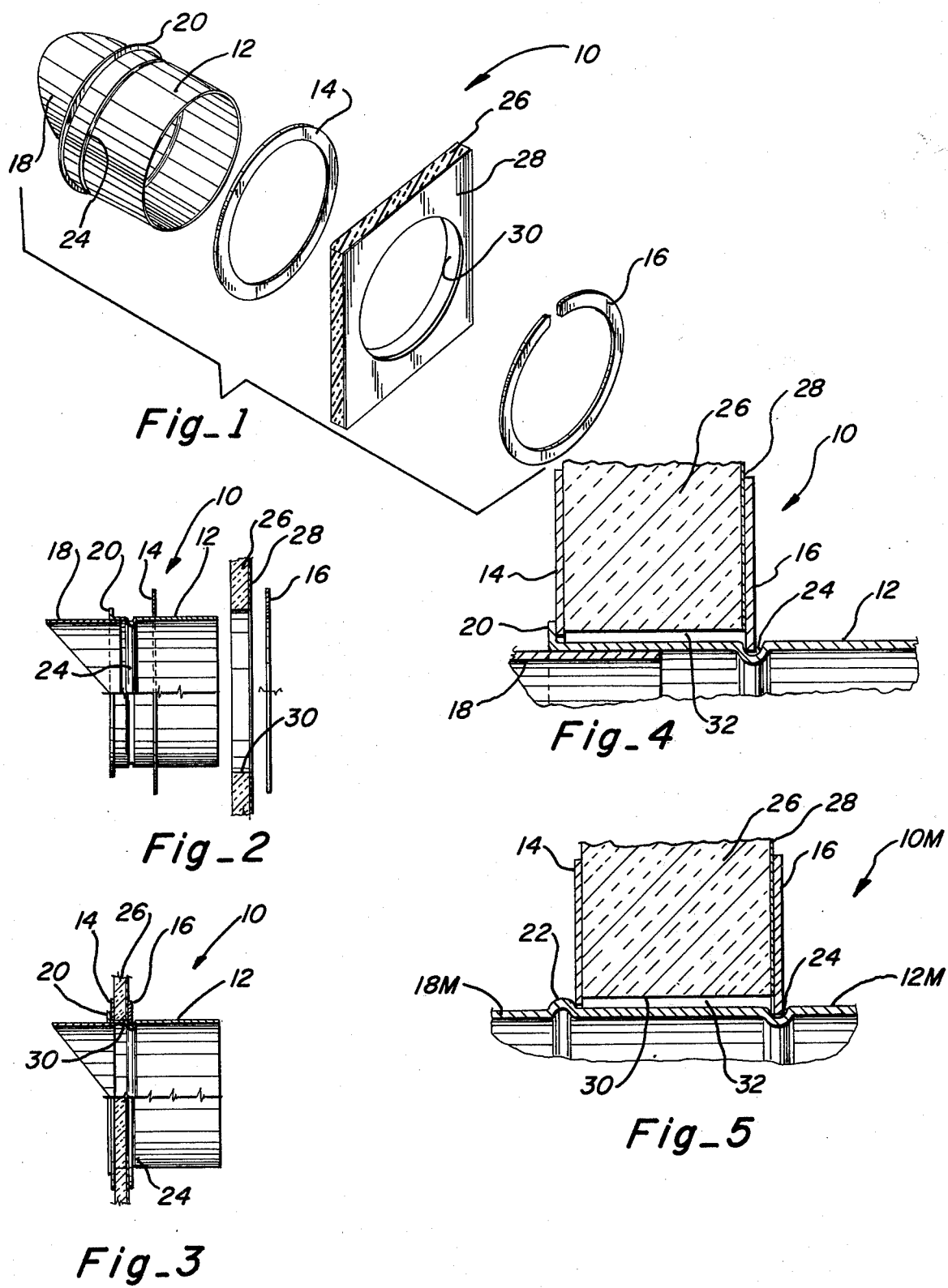

TAKE-OFF FITTING FOR LOW PRESSURE NON-METALLIC DUCT SYSTEMS

A good deal of the sheet metal duct work formerly used in the construction industry to carry air at low positive pressures is being eliminated in favor of non-metallic duct systems constructed of fiberglass panels, the outside surface of which is covered with foil. Ducts of this type have a much improved thermal efficiency when compared with a bare metal duct and they are a great deal less expensive than an insulated one. Labor costs are also less because of the considerable reduction in sheet metal work necessary to construct a complete metal duct system.

Despite the advantages of duct board, its use has created a number of problems, not the least of which is tapping into such a duct with a metal take-off fitting. The usual fasteners like metal screws and rivets cannot be used because the fiberglass panels lack the structural integrity necessary to hold them. The holes cannot be cut in the panels with sufficient precision to insure an air tight seal around the metal sleeve either, therefore, some additional means must be provided to cover any gaps left between the sleeve and edge of the opening bordering same. Overall, the whole operation of connecting branch piping into a main non-metallic duct or plenum must be carried out very gently and with due regard to the fragility of the fiberglass duct board.

One noteworthy attempt at solving some of these problems is the take-off fitting forming the subject matter of U.S. Pat. No. 3,477,745. It provides a fitting which, in installed condition, effectively seals the opening through which the sleeve passes both inside and out with an annular flange-forming ring. No fasteners are used and, instead, a split helicoidal ring is literally screwed through a slit in the fiberglass wall bordering the sleeve opening until it lies wholly on the inside of the duct whereupon it assumes a planar configuration and defines the necessary air tight seal around the opening on the inside.

Despite these many advantages, the unit has one serious shortcoming and that is, once installed, it becomes practically impossible to remove, at least without tearing or otherwise seriously damaging the fiberglass duct board wall in which it is mounted. In other words, once the helicoidal flange has assumed its planar configuration inside the duct, one has a great deal of difficulty finding the split in the ring, introducing the trailing edge thereof into the slit in the panel assuming the latter can be relocated as it is covered up by the outside air sealing ring, reforming the inner split ring into the helicoidal configuration, and unscrewing it from the panel.

It has now been found in accordance with the teaching of the instant invention that these and other shortcomings of the prior art take-off fittings for use with non-metallic duct work can, in large measure, be eliminated by the novel expedient of providing the sleeve with a stop-forming appendage adjacent one end, resting a continuous ring against said appendage so as to produce a seal around the inside of the opening in the duct, forming an annular groove in the sleeve spaced toward the plain end thereof from the stop-forming appendage a distance equal to the thickness of the duct wall, and releasably locking the assembly in place with a deformable split ring detachably locked within the annular groove. The above-described apparatus has the additional advantage not shared by the unit forming the subject matter of U.S. Pat. No. 3,477,745 of being removable from the duct by the simple expedient of removing the lock ring and reversing the novel installation procedure, all of which can be accomplished from outside the duct without damaging the delicate fiberglass walls thereof.

The fitting is simple and less expensive to manufacture than similar commercially available fittings for use in non-metallic ducts. Likewise, it is easy to install and requires no special tools or skill on the part of the sheet metal worker. The resulting take off is secure, sufficiently air tight to meet building code requirements and fully compatible with ordinary sheet metal piping, couplings and other fittings.

It is, therefore, the principal object of the present invention to provide a novel and improved take-off fitting for use in forming branch connections in low pressure non-metallic ducts.

A second objective is the provision of a unique method of installing the take-off fitting which can be accomplished from a position outside the duct.

Another object of the invention herein disclosed and claimed is to provide a sheet metal or plastic collar of the type aforementioned which can be removed from the duct wall without damage thereto by merely reversing the installation procedure.

Still another objective is the provision of a take-off fitting that is so designed that it can easily be formed from metal, molded in plastic or, alternatively, have some parts made of one material and other parts of another.

An additional object is to provide a fitting for use in conjunction with non-metallic ducts that is completely compatible with other standard metallic pipe, fittings and the like including such common appurtenances forming an integral part of the fitting itself as air scoops and dampers.

Further objects are to provide a device of the class described which is versatile, relatively inexpensive, easy to install, rugged, safe, compact, dependable and even decorative in appearance.

Other objects will be in part apparent and in part pointed out specifically hereinafter in connection with the description of the drawings that follows, and in which:

FIG. 1 is an exploded perspective view showing the several elements of the take-off fitting in relation to a fiberglass duct board mold wall in which a hole has been made to receive the sleeve;

FIG. 2 is a diametrical section of the assembly shown in FIG. 1 preparatory to bringing the sleeve with the continuous collar already mounted thereon back through the opening in the duct wall so that the lock ring can be seated in the exposed annular groove;

FIG. 3 is a diametrical section like FIG. 2 and to the same scale except that it shows the assembly in assembled relation;

FIG. 4 is a fragmentary diametrical section to an enlarged scale showing a version in which the sleeve is supplemented by an air scoop welded or otherwise attached thereto and the stop-forming obstruction comprises an integrally-formed annular flange; and, FIG. 5 is a fragmentary diametrical section in FIG. 4 and to the same scale as the latter but showing a modified version wherein the air scoop is formed integral with the sleeve and the stop-forming means comprises a rolled bead.

Referring next to the drawings for a detailed description of the present invention, reference numeral 10 has been chosen to represent the take-off fitting in a general way and it will be seen to comprise an assembly of separate elements, specifically, a sleeve 12, a sealing ring 14 and a lock ring 16. In the particular form shown, all of the sleeves 12 have been equipped with so-called "air scoops" 18 which are old in the art for use with such fittings and, therefore, comprise no part of the present invention. In the version of the unit illustrated in FIGS. 1–4, inclusive, the air scoop 18 is welded, riveted, screwed or otherwise attached to the inside of the sleeve 16 which is equipped with an out turned stop-forming marginal flange 20 at one end thereof. On the other hand, the modified form of the fitting 10M illustrated in FIG. 5 has the air scoop 18M formed integral with the sleeve 12, the latter becoming possible through the use of a rolled annular rib 22 as the stop-forming means replacing out turned marginal flange 20 of the previously described version.

Neither of the sleeves 12 or 12M has been shown equipped with dampers; however, here again, such appurtenances are well known in the art for use in metal air ducts and the like. The addition of such accessories is well within the skill of an ordinary artisan and nothing in the structure of the instant take-off fitting interferes in any way with their inclusion in the structure.

Now, while the entire assembly has been shown as if fabricated from metal, it is to be understood that all or some of the elements could just as well be molded from plastic materials. For instance, sleeves 12 and 12M are both ideally suited to plastic molding techniques due to the presence of the flange 20 or rib 22 together with groove 24 in its surface; whereas, both the sealing ring 12 and lock ring 14 are probably more easily and inexpensively made from metal, especially since different molds are required for each size pipe. Be that as it may, plastic fittings are a definite possibility and contemplated within the scope hereof.

The fiberglass duct board panel 26 from which the non-metallic ducts (not shown) are constructed is customarily faced on the outside with a foil sheet 28 as shown. A hole 30 is cut through the panel sized to pass either the marginal flange 20 of the FIGS. 1–4 modification 10 or the annular rib 22 of the FIG. 5 modification 10M. Ordinarily, the entire sleeve 10 or 10M will be passed all the way through opening 30 into the interior of the duct from the outside. Occasionally, of course, access to the inside of the panel can be had in which event the flange or rib need not be inserted through hole 30. This means, of course, that opening 30 can be reduced in size so as to more closely fit the outside diameter of the sleeve.

Sealing ring 14 must also be passed through the same opening 30 into the interior of the duct along with sleeve 10. The outside diameter of ring 14 is, of course, greater than the diameter of hole 30, however, by bending ring 14 slightly it can be passed easily through the latter. Once inside the duct, ring 14 is assembled onto the sleeve so as to rest against the stop-forming projection (flange 20 or bead 22) on its inner or "lead" end. Obviously, it makes no difference which end of the sleeve is passed through the opening first because, presumably, there is enough room inside the duct to turn the sleeve end-for-end if it is facing the wrong way. Nevertheless, the logical way to handle the matter is to insert the flanged or ribbed end first as it will remain inside the duct. For purposes of differentiating between the sleeve ends, the flanged or ribbed end will be referred to as the "lead" or "remote" or "stop-carrying" end and the opposite end as the "trailing" or, alternatively the "plain" or "near" end.

Once the ring 20 is assembled as shown in FIG. 2 on the sleeve, the trailing end of the latter can be pulled back out through opening 30 as shown in FIGS. 3 and 4. When this occurs, ring 14 will engage the portion of the inner wall of the panel that borders opening 30 therein to form a substantially air tight seal over the gap 32 left between the sleeve and panel due to the necessity of opening 30 being slightly oversized to accommodate the flange or rib at the same time the near face of ring 14 is drawn up tight against the panel in sealed engagement therewith, flange 20 or rib 22 as the case will also be pulled up snug against the remote face of this same ring in the manner most clearly shown in FIGS. 4 and 5.

Ring 14 is sized to engage the exterior surface of the sleeve rather snugly while still allowing for relative slidable movement therebetween. This means, of course, that there is little if any gap left between the ring and sleeve that must be sealed. To the extent one exists, the flange 20 or rib 22 function to seal same.

Ring 14 should be continuous to produce an adequate seal and there really is no reason for it being otherwise. Be that as it may, this ring could, obviously, be split and have the ends adjacent the split closely abutted and still function as intended. In fact, overlapped ends on a split ring would also work especially when one considers the fact that the panel is yieldable and will, for this reason, accommodate an overlapped joint and conform thereto. Once again, while non-continuous rings of various configurations could be substituted for the continuous one shown and still achieve the desired sealing function, no useful purpose would be served by so doing.

Groove 24 is spaced in the direction of the trailing or plain end of the sleeve a distance equal to the thickness of panel 26 measured from the near face of flange 20 or, alternatively, the near face of stop-forming annular rib 22. If anything, groove 24 should be located such that with the split ring 16 seated therein as shown in FIGS. 4 and 5, it will cooperate with sealing ring 14 to slightly compress the highly compressible panel therebetween. Such a relationship ensures a tight fit and corresponding air tight seal which, for obvious reasons, is preferred over a loose one.

Split ring 16 is dimensioned such that the inside diameter thereof is essentially equal to the minimum outside diameter of groove 24. Ring 16, whether fabricated from sheet metal or plastic, will spring open the fraction of an inch necessary for it to slip over sleeve 12 preparatory to being seated in the groove. Since the seal is made on the inner or remote face of panel 26 by ring 14 pressed thereagainst, there is no necessity for split lock ring 16 forming a second seal.

If, for some reason, the take-off fitting must be removed from the duct, one need only reverse the installation procedure. More specifically, by removing the lock ring from groove 24 and slipping it off the near end of sleeve 12, the entire assembly remaining can be pushed into the duct through opening 30, whereupon, sealing ring 14 can be disassembled from the sleeve preparatory to both elements being pulled back through the opening.

What is claimed is:

1. A take-off fitting for use in low pressure non-metallic duct systems of the type including a walled member with at least one planar wall and having an opening in said planar wall thereof which comprises: a tubular sleeve positionable in said opening and having means adjacent one end thereof defining a stop and an annular groove spaced from said stop toward the other end a distance substantially equal to the thickness of said planar wall, said sleeve and stop means being of a shape and size to pass into the interior of said walled member through the opening in said planar wall along a straight line perpendicular thereto; a sealing ring having an opening therein of a shape and size to receive said sleeve with a free sliding fit, said ring being in abutting relation to the stop means and planar wall to bridge and seal any gap left between said opening in the walled member and the outside of the sleeve; and a split lock ring positionable in said groove and having an opening therein of a diameter less than the outside diameter of the sleeve and an outside diameter larger than said opening, said ring being springable to the degree necessary to pass onto said sleeve and detachably lock into the annular groove therein.

2. The take-off fitting as set forth in claim 1 in which: the stop means comprises an out turned substantially circular flange on said one end of the sleeve.

3. The take-off fitting as set forth in claim 1 in which: the stop means comprises a substantially circular annular rib.

4. The take-off fitting as set forth in claim 1 in which: the sealing ring is continuous.

5. The take-off fitting as set forth in claim 1 in which: the inside diameter of the lock ring is substantially equal to the minimum outside diameter of the annular groove.

6. The take-off fitting as set forth in claim 3 in which: the sleeve comprises a sheet metal tube; and, in which the annular rib comprises a bead rolled therein from the inside.

7. The take-off fitting as set forth in claim 4 in which: the sealing ring comprises a flat disc with a circular opening in the center thereof.

* * * * *